(12) United States Patent
Döffinger

(10) Patent No.: US 9,454,844 B2
(45) Date of Patent: Sep. 27, 2016

(54) EARLY DEPTH TESTING IN GRAPHICS PROCESSING

(71) Applicant: ARM LIMITED, Cambridge (GB)

(72) Inventor: Reimar Gisbert Döffinger, Lund (SE)

(73) Assignee: ARM Limited, Cambridge (GB)

( * ) Notice: Subject to any disclaimer, the term of this patent is extended or adjusted under 35 U.S.C. 154(b) by 182 days.

(21) Appl. No.: 14/504,846

(22) Filed: Oct. 2, 2014

(65) Prior Publication Data

US 2015/0097831 A1    Apr. 9, 2015

(30) Foreign Application Priority Data

Oct. 7, 2013 (GB) .................................. 1317703.5

(51) Int. Cl.
*G06T 15/40* (2011.01)

(52) U.S. Cl.
CPC ......... *G06T 15/405* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 6,734,861 B1 * | 5/2004 | Van Dyke | ............. | G06T 15/005 345/506 |
| 7,034,828 B1 * | 4/2006 | Drebin | .................. | G06T 15/005 345/426 |
| 7,088,368 B1 * | 8/2006 | Andrews | ............... | G06T 15/005 345/418 |
| 2008/0094412 A1 * | 4/2008 | Jiao | ........................ | G06T 15/005 345/621 |
| 2009/0083497 A1 * | 3/2009 | Yu | ........................ | G06F 12/0842 711/144 |

OTHER PUBLICATIONS

Search Report for GB 1317703.5 dated Mar. 27, 2014 (1 page).
Yu, Chang-Hyo, et al., "An Area Efficient Early Z-Test Method for 3-D Graphics Rendering Hardware", IEEE Transactions on Circuits and Systems I: Regular Papers, vol. 55, No. 7, Aug. 1, 2008, pp. 1929-1938.
Batagelo, H, et al., "Dynamic Scene Occlusion Culling Using a Regular Grid", Proceedings of the XV Brazilian Symposium on Computer Graphics and Image Processing, Oct. 7-10, 2002, pp. 43-50.

* cited by examiner

*Primary Examiner* — Kee M Tung
*Assistant Examiner* — Frank Chen
(74) *Attorney, Agent, or Firm* — Nixon & Vanderhye P.C.

(57) ABSTRACT

An apparatus for processing graphics primitives for display includes rasterization, depth testing, and rendering circuitry. The depth testing circuitry determines if a selected graphics fragment would be obscured when displayed by comparing a depth comparison function and a depth value associated with the selected graphics fragment with a stored depth value. The depth testing circuitry suppresses rendering operations for the fragment if the selected fragment would be obscured. An update indication shows a possible change direction due to the updating for a stored depth value which depends on a received depth comparison function. The depth testing for the selected fragment is performed using the possible change direction shown by the update indication to modify the depth comparison function to allow for updating of the stored depth value by the rendering operations.

19 Claims, 7 Drawing Sheets

| DEPTH COMPARISON FUNCTION | CURRENT UPDATE INDICATION |
|---|---|
| ALWAYS PASS | 11 |
| < | 01 |
| ≤ | 01 |
| > | 10 |
| ≥ | 10 |
| != | 11 |
| == | 00 |
| NEVER PASS | 00 |

FIG. 5

| STORED UPDATE INDICATION | INTERPRETATION |
|---|---|
| 00 | Z BUFFER VALUE IS CORRECT. EITHER NO UPDATES PENDING OR Z CMP $F^N$ WAS ALWAYS "==" |
| 01 | Z BUFFER VALUE CAN BE DECREASED BY PENDING UPDATES. |
| 10 | Z BUFFER VALUE CAN BE INCREASED BY PENDING UPDATES. |
| 11 | Z BUFFER VALUE COULD CHANGE IN EITHER DIRECTION |

FIG. 6

EARLY DEPTH TESTING IN GRAPHICS PROCESSING

This application claims priority to GB 1317703.5 filed 7 Oct. 2013, the entire contents of which is hereby incorporated by reference.

FIELD OF THE INVENTION

The present invention relates to graphics processing. In particular it relates to performing depth testing in graphics processing to determine if a graphics fragment would be obscured by at least one other graphics fragment when displayed.

BACKGROUND OF THE INVENTION

Contemporary graphics processing systems are commonly arranged in a pipelined fashion, in which specialised tasks are carried out by sequential elements of the pipeline. For example, it is known for a graphics processing apparatus to receive its input in the form of basic components known as graphics primitives, usually in the form of simple polygons, such as triangles. At a very general level, these graphics primitives are then passed through two main processing stages, namely a rasterization stage and a rendering stage (with which the skilled person is familiar and are therefore not described in detail here). The rasterization stage results in graphics fragments, each graphic fragment representing a limited number of sampling points used to represent the graphics primitive from which that graphics fragment derives. The subsequent rendering process then determines the display characteristics for each graphics fragment, for example its colour and relative transparency. Following the rendering process, the rendered graphic fragments are output for display, for example, via accumulation in a display buffer.

A known part of such a graphics processing pipeline is "depth testing", wherein a selected graphics fragment is examined to determine if it would be obscured by at least one other graphics fragment in the final display. Since it is clearly only necessary to display those graphics fragments which will be (at least partially) visible to the viewer of the display, any graphics fragments which are determined to be fully obscured can be eliminated from the graphics processing.

Such depth testing is often configured to take place after the rendering stage because it is often only at that point in the graphics pipeline that it can be finally determined if a given graphics fragment will be obscured, due to certain display characteristics (such as transparency) only becoming available after the rendering stage. This may not only be due to the required information not being available for that graphics fragment itself, but can also be because the required information for another graphics fragment at the same display location not yet being available. It is however advantageous to perform the depth testing as early in the graphics processing pipeline as possible, because of the opportunity it provides to avoid unnecessary processing of graphics fragments which will ultimately not be displayed. In particular, a great deal of the processing which must be carried out for the graphics fragments takes place at the rendering stage (also known as the shader pipeline) and it would therefore be preferable to perform depth testing before entering the shade of pipeline.

Such "early" depth testing is therefore sometimes performed, however it is limited to those cases where the required information is already available.

Some background information relating to (early) depth testing can be found in the commonly assigned U.S. patent application Ser. No. 13/907,550, the entire contents of which are incorporated herein by reference.

Nevertheless, given the intensity of processing carried out for each graphics fragment in the shader pipeline, it would be desirable to improve the opportunities to perform early depth testing.

SUMMARY OF THE INVENTION

Viewed from a first aspect, the present invention provides an apparatus for processing graphics primitives for display, comprising, in sequence: rasterization circuitry, depth testing circuitry and rendering circuitry, the rasterization circuitry configured to perform rasterization operations on the graphics primitives to generate graphics fragments; the depth testing circuitry configured to perform depth testing with respect to a selected graphics fragment of the graphics fragments to determine if the selected graphics fragment would be obscured by at least one other graphics fragment when displayed by comparing a depth comparison function and a depth value associated with the selected graphics fragment with a stored depth value associated with a display location for the selected graphics fragment; and the rendering circuitry configured to receive the graphics fragments and to perform rendering operations on the graphics fragments, wherein the depth testing circuitry is configured to suppress the rendering operations with respect to the selected graphics fragment if the depth testing indicates that the selected graphics fragment would be obscured, wherein the rendering operations performed by the rendering circuitry cause updating of stored depth values associated with display locations for at least some graphics fragments, wherein the depth testing circuitry is configured to store an update indication in dependence on a received depth comparison function, wherein the update indication shows a possible change direction due to the updating for a stored depth value which depends on that received depth comparison function, and wherein the depth testing circuitry is configured to perform the depth testing with respect to the selected graphics fragment using the possible change direction shown by the update indication to modify the depth comparison function to allow for the updating of the stored depth value by the rendering operations.

Viewed from a second aspect the present invention provides a method of processing graphics primitives for display, comprising, in sequence: a rasterization step, a depth testing step and a rendering step, the rasterization step comprising performing rasterization operations on the graphics primitives to generate graphics fragments; the depth testing step comprising performing depth testing with respect to a selected graphics fragment of the graphics fragments to determine if the selected graphics fragment would be obscured by at least one other graphics fragment when displayed by comparing a depth comparison function and a depth value associated with the selected graphics fragment with a stored depth value associated with a display location for the selected graphics fragment; and the rendering step comprising receiving the graphics fragments and to perform rendering operations on the graphics fragments, wherein the depth testing step is configured to suppress the rendering operations in the rendering step with respect to the selected graphics fragment if the depth testing indicates that the selected graphics fragment would be obscured, wherein the rendering operations cause updating of stored depth values associated with display locations for at least some graphics fragments, wherein the depth testing step comprises storing an update indication in dependence on a received depth comparison function, wherein the update indication shows a possible change direction for a stored depth value which depends on that received depth comparison function, and wherein the depth testing in the depth testing step is performed with respect to the selected graphics fragment using the possible change direction shown by the update indication to modify the depth comparison function to allow for updating of the stored depth value by the rendering operations.

Viewed from a third aspect the present invention provides an apparatus for processing graphics primitives for display, comprising, in sequence: means for performing rasterization operations on the graphics primitives to generate graphics fragments; means for performing depth testing with respect to a selected graphics fragment of the graphics fragments to determine if the selected graphics fragment would be obscured by at least one other graphics fragment when displayed by comparing a depth comparison function and a depth value associated with the selected graphics fragment with a stored depth value associated with a display location for the selected graphics fragment; and means for performing rendering operations on the graphics fragments, wherein the means for performing depth testing is configured to suppress the rendering operations by the means for performing rendering with respect to the selected graphics fragment if the depth testing indicates that the selected graphics fragment would be obscured, wherein the rendering operations cause updating of stored depth values associated with display locations for at least some graphics fragments, wherein the means for performing depth testing is configured to store an update indication in dependence on a received depth comparison function, wherein the update indication shows a possible change direction for a stored depth value which depends on that received depth comparison function, and wherein the depth testing is performed with respect to the selected graphics fragment using the possible change direction shown by the update indication to modify the depth comparison function to allow for updating of the stored depth value by the rendering operations.

BRIEF DESCRIPTION OF THE DRAWINGS

The present invention will be described further, by way of example only, with reference to embodiments thereof as illustrated in the accompanying drawings, in which:

FIG. 5 shows a table indicating the translation of a received depth comparison function into a 2-bit current update indication in one embodiment;

FIG. 6 shows a table giving the interpretation of a 2-bit stored update indication in one embodiment.

DESCRIPTION OF EMBODIMENTS

Figure 1:
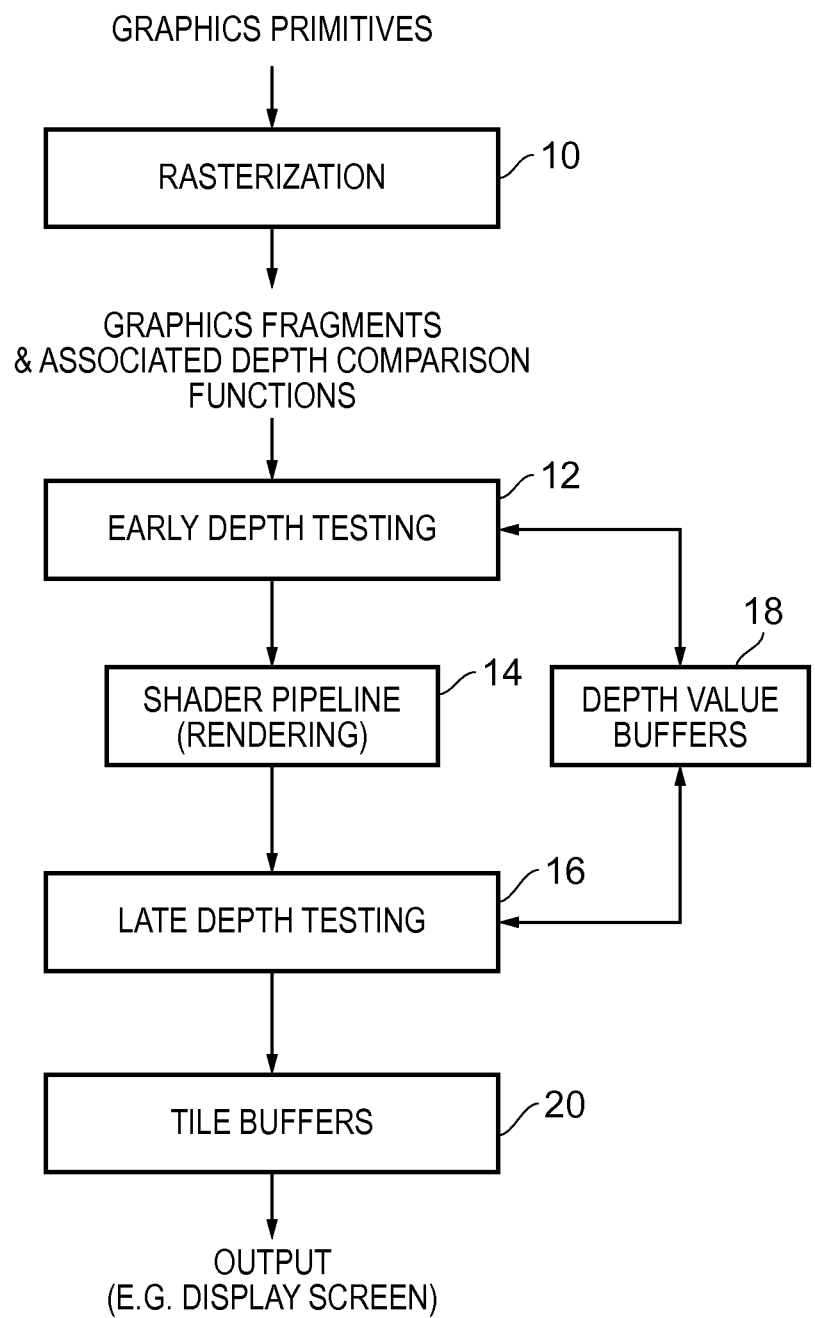
FIG. 1 schematically illustrates the functional steps of a graphics processing apparatus in one embodiment.

According to the present techniques, the apparatus comprises rasterization circuitry, depth testing circuitry and rendering circuitry in sequential order. Note therefore that the depth testing circuitry precedes the rendering circuitry and therefore the apparatus is configured (where possible) to perform early depth testing.

A graphic fragment which is received by the depth testing circuitry from the rasterization circuitry will generally be accompanied by a depth comparison function which indicates how the depth testing is to be performed. For example, the depth comparison function may be "is greater than", meaning that if a depth value associated with this graphics fragment is greater than the depth values associated with other graphics fragments at this display location, then the graphics fragment should be displayed (for example because it forms part of a graphics primitive which is intended to be displayed at the front with respect to the viewer). Accordingly, the apparatus stores depth values associated with each display location (for example in a dedicated buffer) against which the depth value associated with a particular graphics fragment may be compared (using its associated depth comparison function).

However, an issue which previously has prevented early depth testing from being carried out is that the stored depth value associated with a given display location may not be "final", in that it may yet be updated by other graphics fragments which are currently being processed in the shader pipeline.

However, the present techniques allow some early depth testing to be carried out, even though it is known that the stored depth value associated with a display location for a current graphics fragment has pending updates, in that it is known that at least one other graphics fragment associated with this display location has entered the rendering circuitry and the rendering operations being performed by the rendering circuitry may cause the stored depth value to be updated. This is made possible by the storage of an update indication in the depth testing circuitry which indicates how a stored depth value may change due to the pending updates, in particular due to the processing operations being performed by the rendering circuitry. The possible change direction depends on the depth comparison function associated with the graphics fragment(s) for which the updates are pending. For example, where the depth comparison function seen has been "is greater than" although it is not known whether the pending update(s) will in fact change the stored depth value, it can be said that the updating will only cause the stored depth value to increase (if at all). On this basis, the depth testing circuitry according to the present techniques is configured to use the stored update indication to modify the depth comparison function associated with a current graphics fragment under consideration to allow it to perform early depth testing even though there are possible updates to the stored depth value pending. For example, in the above mentioned example where the depth comparison function seen is given by "is greater than" and therefore the update indication will show that the stored depth value may increase, the depth testing circuitry is configured to modify the depth comparison function associated with a newly received graphics fragment to allow for the fact that the stored depth value might be valid as it is or might increase.

There can remain situations when the early depth testing according to the present techniques do not allow a conclusion to be drawn as to whether the newly received graphics fragment will indeed be obscured or not, for example because the range of values which remain possible for the stored depth value do not allow a decision with respect to obscuration to be made. Nevertheless, it has been found that an improvement in performance results due to those cases where the present techniques do allow a decision to be made, in particular where whatever the update that is finally made to the stored depth value the current graphics fragment would always be obscured and therefore further processing with respect to this graphics fragment can be abandoned. If such a graphics fragments would, in the prior art, have entered the rendering circuitry (shader pipeline), significant data processing effort would have been expended before it was later determined that this data processing had been unnecessary.

In some embodiments the apparatus comprises a depth value storage unit configured to store a plurality of depth values and the depth testing circuitry is configured to store update indications for each of the plurality of depth values. Thus the apparatus may comprise a depth value storage unit, for example arranged as a buffer in an area of memory provided for this purpose, in which a plurality of depth values are stored. As mentioned above, the stored depth values are associated with the display locations of the graphics fragments and therefore a typical arrangement in this embodiment is for the depth value storage unit to store a depth value corresponding to each display location. In this embodiment the depth testing unit circuitry is configured to store update indications for each of those depth values/display locations. This then enables the depth testing circuitry to determine a possible change direction for each of the plurality of depth values/display locations.

In some embodiments the apparatus comprises a depth value storage unit configured to store a plurality of depth values and the depth testing circuitry is configured to store a single update indication for the plurality of depth values. Investigation of the present techniques has found that comparable performance improvement may be obtained when only a single update indication is stored by the depth value storage unit for the plurality of depth values by the depth value storage unit. This is understood to be due to the fact that the depth comparison function which accompanies the graphics fragment received by the depth testing circuitry rarely changes within a given processing session and is therefore likely to be the same for many if not all of the encountered graphics fragments. This embodiment has the further advantage that less storage provision (in fact only sufficient storage for a single update indication) needs to be provided within the depth testing circuitry and significant valuable circuitry area (for example within the context of a contemporary system-on-chip device) is not consumed.

In some embodiments the apparatus is configured to subdivide a display frame into a plurality of tiles and is configured to process graphics primitives for display on a tile-by-tile basis, wherein the depth testing circuitry is configured to store the update indication for each tile processed by the apparatus. Tile based graphics processing is a common configuration for contemporary graphics processing systems and the depth testing circuitry may therefore, in such an arrangement, be configured to have depth value storage corresponding to a tile's display area and in this embodiment the depth testing circuitry may store a single updated indication for each tile. As mentioned above, the depth comparison function may change relatively infrequently and therefore it has been found that storing a single update indication corresponding to each tile allows an advantageous balance to be struck between performance improvement and required additional storage. In one embodiment the depth testing circuitry is configured to reset the update indication after each tile processed by the apparatus. This therefore allows each tile processed by the apparatus to be handled entirely independently with respect to the early depth testing.

In some embodiments the depth testing circuitry is configured to store the update indication for each display frame processed by the apparatus. Such an embodiment is for example applicable to a configuration in which the apparatus is configured in an "immediate" mode of graphics processing wherein graphics primitives are fully processed (rasterized and rendered) as they are received. In such an embodiment it may be found to be unlikely for the depth comparison function accompanying each graphics fragment to change within the course of each display frame and therefore a single update indication for each display frame may suffice to bring performance improvement.

In some embodiments the depth testing circuitry is configured to reset the update indication after each display frame processed by the apparatus. This thus enables the depth testing circuitry to treat each display frame individually as regards the early depth testing.

In some embodiments the depth testing circuitry is configured to reference a pending update indication to determine if updating of the stored depth value associated with the display location for the selected graphics fragment can subsequently occur, and wherein the depth testing circuitry is configured only to use the possible change direction shown by the update indication to modify the depth comparison function if the pending update indication shows that the updating can subsequently occur. Keeping track of whether updating of the stored depth value associated with the display location for the graphics fragment currently under consideration thus enables the testing circuitry to only modify the depth comparison function associated with the current graphics fragment if it is known that the updating of the stored depth value could subsequently occur.

The pending update indication could be derived from a number of sources. For example, in one embodiment the pending update indication is stored within the depth testing circuitry. The depth testing circuitry may therefore in such an embodiment be configured to maintain a record of whether a graphics fragment has passed through the depth testing circuitry for which updating of the corresponding stored depth value could occur. In another embodiment the pending update indication is stored within the rendering circuitry. It is within the rendering circuitry that the further graphics processing with regard to the graphics fragment is taking place and it may therefore be constructionally advantageous for the pending update indication to come from this source. For example, the depth testing circuitry may be configured to query the rendering circuitry with regard to a specified display location and the rendering circuitry may be configured to respond with an indication (i.e. a pending update indication) showing whether it is currently processing a graphics fragment at that display location.

The pending update indication may be stored at a range of granularities, but in one embodiment the pending update indication is stored per display location.

In some embodiments the depth testing circuitry is configured to reset the update indication when the rendering circuitry is not performing rendering operations. When the rendering circuitry is not performing rendering operations, i.e. when the shader pipeline is empty, there can be no depth value updates pending and therefore this represents a practical opportunity to reset the update indication.

In some embodiments modifying the depth comparison function to allow for updating of the stored depth value comprises treating the stored depth value as a boundary of a range of depth values. For example, where the depth comparison function associated with the graphics fragment which may cause updating of the stored depth value is given by "is greater than" or "is less than", it can be known that the stored depth value represents a boundary of a range of possible depth values which the stored depth value may take after that updating has completed.

In some embodiments the depth testing circuitry is configured to store the update indication to show that the stored depth value will not be changed by the rendering operations. The update indication can therefore be configured to indicate that the stored depth value is correct, this situation arising in the event that no updates are pending or for example where the depth comparison function has always been "is equal to" (which therefore cannot affect the stored depth value).

In some embodiments the depth testing circuitry is configured to store the update indication to show that the rendering operations do not allow the depth testing to be performed. For example, it may be the case that the depth comparison functions encountered have switched from "is less than" to "is greater than", or for example that the depth comparison function may have been "is not equal to", meaning that the pending updates could change the stored depth value in either direction, meaning that no early depth testing can be performed.

In some embodiments the updating of stored depth values is carried out by further depth testing circuitry which follows the rendering circuitry. It should be appreciated that this "following" corresponds to the order in which items are processed in the graphics pipeline and not necessarily to the physical arrangement of separate components in the pipeline. In other words, this "late" depth testing circuitry may well be provided by the same physical component as the "early" depth testing circuitry. Moreover it should be understood that although it is the processing of the rendering circuitry which causes the updating of the relevant stored depth values (e.g. by determining the depth values for given graphics fragments), in such embodiments it is the further depth testing circuitry which actually updates those stored depth values.

It will be appreciated that the update indication could take a variety of forms, but in one embodiment the depth testing circuitry is configured to store the update indication as a 2-bit value. A 2-bit value has been found to provide an advantageous compromise between the required storage space and the amount of information this can represent. For example, the four different states which can be represented by a 2-bit value can be used to represent that: the stored depth value is correct; the stored depth value could decrease; the stored depth value could increase; or the stored depth value could change in either direction (i.e. increase or decrease).

FIG. 1 schematically illustrates at a high level the main processing steps which are performed in a graphics processing system which receives graphics primitives and ultimately turns these into display output. The graphics primitives first enter a rasterization stage 10, which essentially takes the polygons of the graphics primitives (represented in a vector format) and converts these into corresponding pixel data. These pixel data are then passed beyond the rasterization stage in the form of graphics fragments, which may for example correspond to individual (or small collections of) pixels. Each graphics fragment may have various items of further information associated with it, for example which allow the graphic fragment to be correctly shaded in the shader pipeline 14. One particular additional item of information which may be associated with a graphics fragment is a depth comparison function, which enables the determination to be made as to whether the graphics fragment will be obscured in the final display by at least one other graphics fragment.

Figure 2:
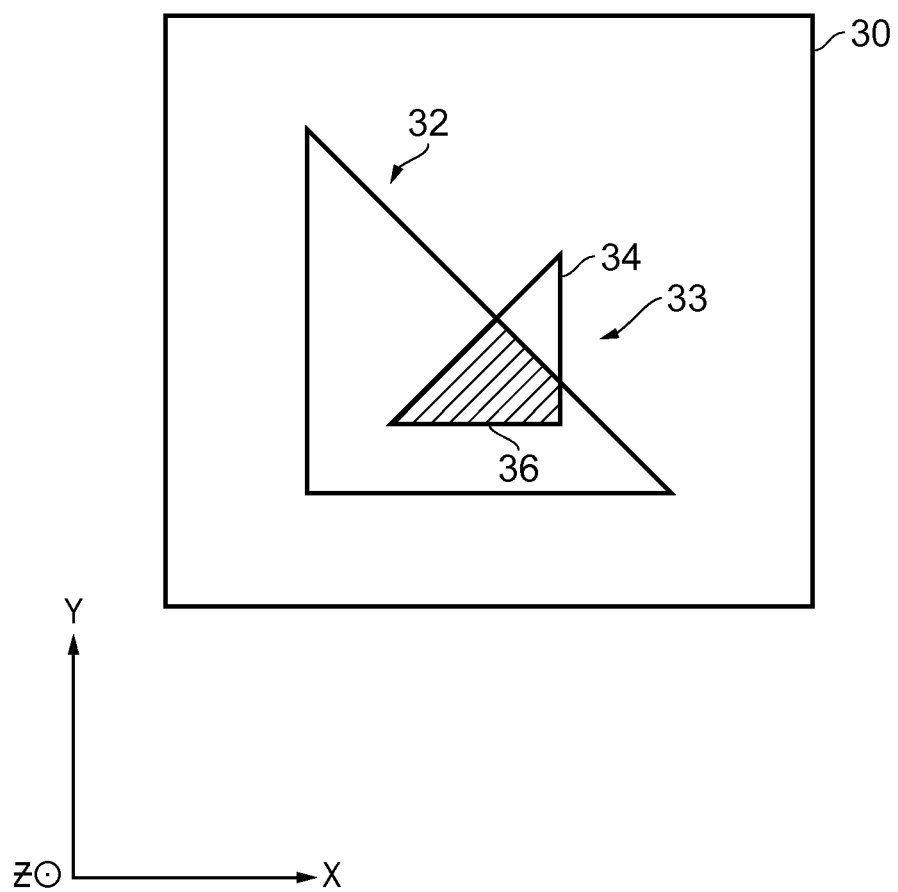
FIG. 2 schematically illustrates the obscuration in display of one displayed object by another.

FIG. 2 schematically illustrates a simple example, showing how some graphics fragments may be obscured in the final display. In the example shown in FIG. 2, in the full display area 30 there are shown 2 polygons (in this example triangles) 32 and 33. The triangles 32 and 33 substantially overlap and thus (assuming the front most triangle is fully opaque) the portion of the rear most triangle which is covered by the front most triangle will be obscured in display. Accordingly, in an example such as this, the graphics fragments which make up each of the triangles 32 and 33 may have an associated depth comparison function which indicates "is greater than". This indicates that for the purposes of depth testing, a graphics fragment should "pass" (i.e. continue through the graphics processing pipeline) if the Z (i.e. depth) value associated with the graphics fragment is greater than any Z values which the pipeline has already encountered for this display position in this display frame. Taking the example shown in FIG. 2, where the overlap portion 36 of triangle 33 is intended to lie behind the triangle 32, the associated depth comparison functions and depth values for the graphics fragments which make up this overlap portion 36 will indicate to the graphics processing pipeline that the overlap portion 36 of triangle 33 will be obscured by the graphics fragments of triangle 32 which cover the same display locations as the overlap portion 36. In the event that the triangle 34 enters the graphics processing pipeline after the triangle 32 has already passed through, processing associated with the graphics fragments representing the hidden portion 36 of triangle 33 may therefore be abandoned, because it is known that these will never be displayed.

Referring back to FIG. 1, it can be seen that the first stage encountered by the graphics fragments generated by the rasterization stage 10 is the early depth testing stage 12. In the example discussed above with reference to FIG. 2 of triangles 32 and 33 being fully opaque, and where it is already known after the rasterization stage 10 that these triangles are fully opaque, it is the early depth testing stage 12 which can test the graphics fragments of the two triangles and in particular can "cull" the graphics fragments in the overlap area 36 which it is known will be obscured in display. As in clear however from the above discussion, the culling of graphics fragments in the early depth testing stage 12 is therefore generally reliant on the relevant Z (i.e. depth) values being available for the early depth testing stage 12 for this determination to be made. As illustrated in FIG. 1, the early depth testing stage 12 has access to depth value buffers 18 in which a depth value stored for the current display location under consideration can be referenced, this depth value indicating the depth value of the front-most graphics fragment (or more generally the depth value of the graphics fragment which should be displayed) which has yet been encountered for this display location.

Figure 3:
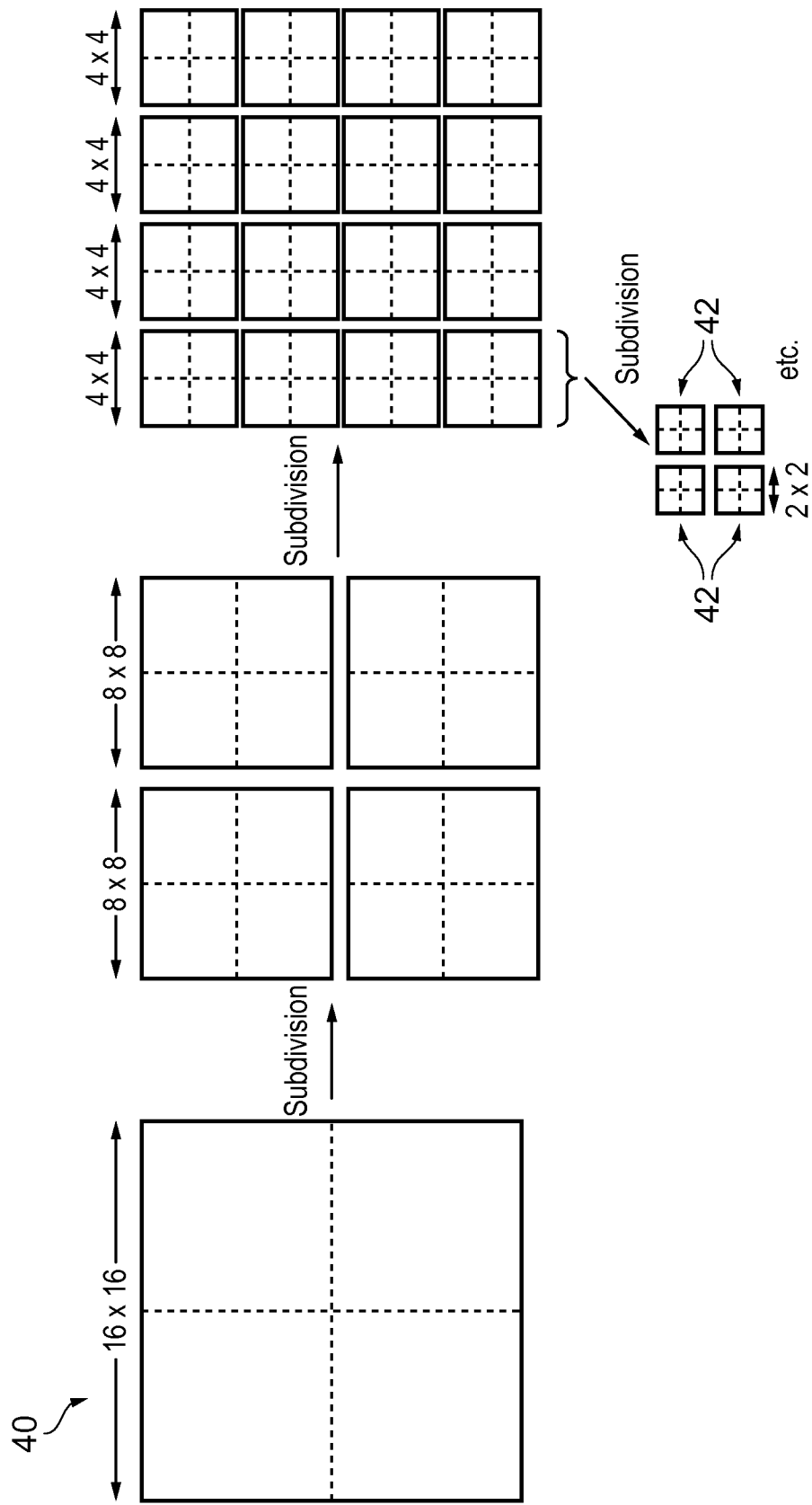
FIG. 3 schematically illustrates the subdivision of a tile of pixels into 2×2 "quads" of pixels.

Such conventional early depth testing may not always be possible, in particular where the depth value for a given display location stored in the depth value buffers 18 can be updated as a result of the rendering stage 14 (also known as the shader pipeline). This can for example be the case where the opacity of a given graphics fragment is not finally determined until it has passed through the shader pipeline 14, for example where the shader pipeline 14 performs an alpha (transparency) test on the graphics fragment. For this reason the late depth testing stage 16 is provided which can perform the determination of which graphics fragment will be visible and which will be obscured once the full rendering process has completed. Note that the late depth testing stage 16 and the early depth testing stage, being functionally very similar, may be provided by a single physical unit which performs depth testing at both stages. Thereafter, the graphics fragments which are determined to be visible are accumulated in the tile buffers 20 (since this example embodiment is a tile-based graphics processing system) from where they are then output for display. FIG. 3 gives a schematic overview of the constitution of a "tile", this being represented by a block of 16×16 pixels as shown by item 40 in FIG. 3. Each tile 40 is sequentially subdivided down to 2×2 blocks of pixels known as "quads" 42. In the embodiments discussed herein, a "quad" 42 represents the smallest processing entity within the graphics processing system and thus the granularity of the graphic fragments which are passed from the rasterization stage 10 into the remainder of the graphics processing pipeline.

It should be noted however, that the early depth testing unit 12 (see FIG. 1) of the embodiment described here is not limited to only be able to perform depth testing if the relevant depth value stored in the depth value buffers 18 is known to be the final depth value for that display location. In other words, the early depth testing unit 12 is configured to be able to perform some early depth testing even if it is known that updates to the relevant depth value in the depth value buffers 18 are pending. Further detail of the early depth testing unit 12 is now described with reference to FIG. 4 to explain this.

Figure 4:
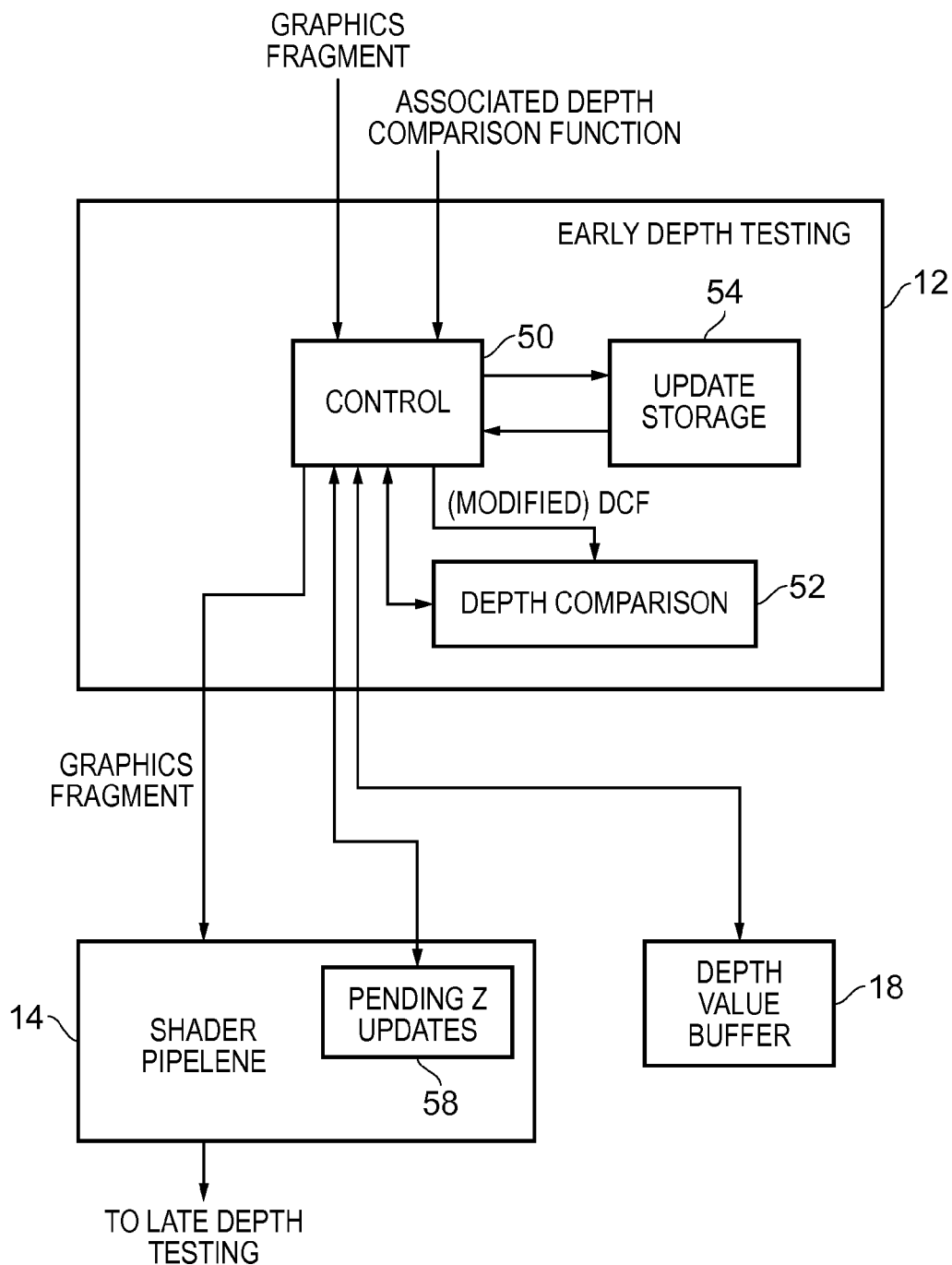
FIG. 4 schematically illustrates an early depth testing unit and shader pipeline in one embodiment.

Early depth testing unit 12 operates under the general control of control unit 50. As discussed above, the early depth testing unit 12 receives graphics fragments generated by the rasterization process, and in particular each graphics fragment has an associated depth comparison function. For the purposes of the present description these are illustrated in FIG. 4 as being two separate inputs to the early depth testing unit, but it will be understood by those skilled in the art that the particular format in which this information is received can vary. In the situation where "normal" early depth testing is possible, i.e. where there are no pending updates for the stored Z value at the relevant display location, the control unit 50 is configured to retrieve the stored depth value for the relevant display location for a received graphics fragment from the depth value buffer 18 and to pass the depth comparison function received in association with the current graphics fragment unit to the depth comparison unit 52 along with the retrieved stored depth value. The depth comparison unit 52 can then indicate to the control unit 50 if the graphics fragment passes or fails the early depth testing. When the graphics fragment fails, the control unit 50 is configured to prevent further processing being carried out with respect to this graphic fragment. In particular the graphics fragment is not passed further in the pipeline (i.e. to shader pipeline 14).

Early depth testing unit 12 is however also figured to be able to perform early depth testing when updates to the depth values stored in the depth value buffer 18 are pending. Firstly, the control unit 50 is able to determine if there are pending depth value (Z) updates with respect to the relevant display location. FIG. 4 schematically illustrates that this information is retrieved from information source 58 in the shader pipeline 14. Since the shader pipeline needs to know the display location for each processing thread which is currently active in the shader pipeline, this information is in principle available in the shader pipeline anyway and the shader pipeline 14 can be configured to respond to an enquiry by the control unit 50 regarding whether processing is currently being carried out for a specified display location.

When the control unit 50 determines with respect to this pending Z updates information 58 that one or more updates are pending for the display location of the current graphics fragment under consideration, it is configured to refer to the update storage 54 to determine what is known about the nature of those updates. Update storage 54 is configured in this embodiment to store 2 bits of information per processed tile, these 2 bits being updated on the basis of the depth comparison functions which the control unit 50 has seen in association with the graphics fragment(s) for which depth value updates are (were) pending. Note that whilst the update storage 54 is within the early depth testing unit 12 in the illustrated embodiment, it could also be stored elsewhere in the apparatus.

FIG. 5 sets out a conversion table which is used by the control unit 50 to translate the depth comparison function seen in association with a graphic fragment for which Z updates are pending and the 2-bits of information which are stored in the update storage 54 as a result. In dependence on the 2-bits of information which the control unit 50 finds to be held in the update storage unit 54 the depth comparison function associated with the current graphics fragment may be modified and the depth comparison unit 52 may perform early depth testing with respect to the current graphics fragment of the basis of that modified depth comparison function. Further detail of when this does and does not happen is described with reference to the steps set out in FIG. 7.

Firstly though the general interpretation of the stored update indication is set out in the table of FIG. 6. Where the stored update indication is 00, this indicates that the stored depth value for the relevant display location in the depth value buffer 18 is correct, i.e. will not change as a result of any pending updates associated with this display location. This may be due to the fact that there are simply no updates pending, or could be because the depth comparison functions seen thus far have always been "is equal to" (which will thus not cause any update to the stored depth value).

If the stored update indication is 01, this indicates that the stored depth value for the relevant display location may be decreased by the pending updates. In this situation the control unit 50 is configured to modify the depth comparison function associated with the current graphics fragment to allow the current graphics fragment to pass early depth testing if its associated depth value is less than or equal to the currently stored depth value for this display location in depth value buffer 18, since it is already known that the pending updates for this display location will only decrease the stored depth value (Z buffer value). In other words, the current graphics fragment will only fail the early test if its associated depth value is greater than the currently stored depth value.

Conversely if the stored update indication is 10 this indicates that the stored depth value for the relevant display location may be increased by the pending updates. In this situation the control unit 50 is configured to modify the depth comparison function associated with the current graphics fragment to allow the current graphics fragment to pass early depth testing if its associated depth value is greater than or equal to the currently stored depth value for this display location in depth value buffer 18, since it is already known that the pending updates for this display location will only increase the stored depth value (Z buffer value). In other words, the current graphics fragment will only fail the early test if its associated depth value is less than the currently stored depth value.

Finally, if the stored update indication is 11 this indicates that the Z buffer value could change in either direction, for example because the depth comparison functions seen may be have switched from "is less than" to "is greater than" (or vice versa), or because a depth comparison function "is not equal to" has been seen (which could cause any updating of the stored value). Early depth testing is then not possible and the control unit 50 is configured to allow this graphics fragment to pass further into the shader pipeline 14.

Figure 7:
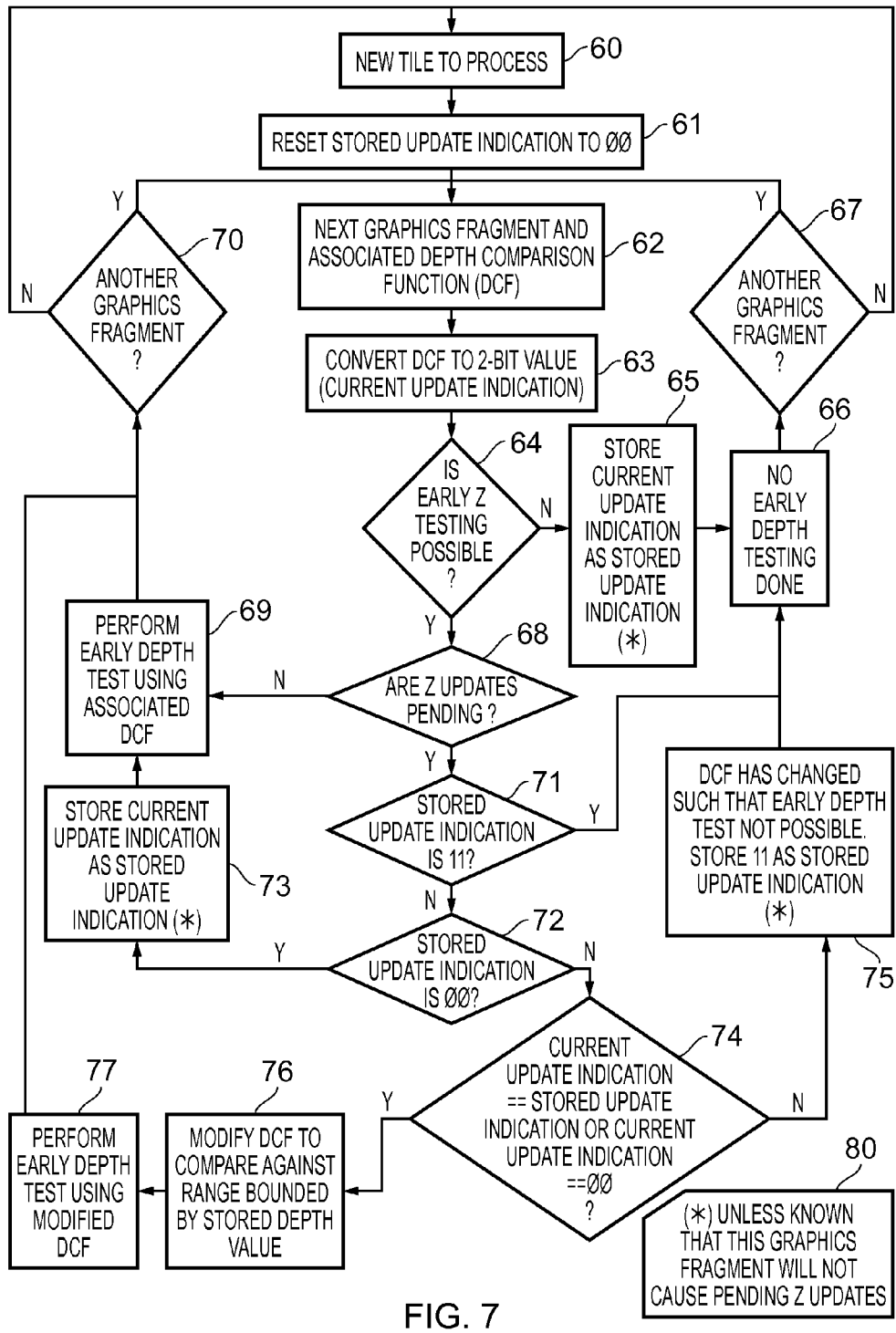
FIG. 7 schematically illustrates a sequence of steps which may be taken in the method of one embodiment.

FIG. 7 schematically illustrates a sequence of steps which may be taken by the early depth testing unit 12. The flow begins at step 60 where the processing of a new tile begins. The stored update indication held by update storage 54 is maintained on a per-tile basis and accordingly when the processing of a new tile begins, at step 61 the stored update indication is reset to 00. Then at step 62 the next graphics fragment and its associated depth comparison function (DCF) are received by the early depth testing unit 12 and in particular by the control unit 50. The control unit 50 converts the received depth comparison function at step 63 into a corresponding 2-bit value (according to the conversions set out in FIG. 5). This is termed the current update indication. At step 64 it is then determined if early depth (Z) testing is possible. There are several reasons why early depth testing may not be possible, for example the Z value associated with this graphics fragment may not be available. This graphics fragment then itself represents a graphics fragment which will enter the shader pipeline and for which Z updates will be pending. Accordingly, when this graphics fragment enters the shader pipeline 15 the pending Z updates 58 will be updated accordingly. There are however other reasons why early Z testing may not be possible, for example if the early depth testing unit 12 is currently overloaded, a required stencil value is not available, or if information accompanying the graphics fragment indicates that early depth testing should not be performed. In any of these cases when early Z testing is not possible the flow proceeds to step 65 where the current update indication is stored in update storage 54 as the stored update indication, unless (see box 80 in FIG. 7) it is known that this graphics fragment will not cause pending Z updates, which could for example occur at this point in the flow diagram if depth updates for the current graphics fragment are disabled. No early depth testing is then performed (step 66) and the flow proceeds to step 67 where it is determined if another graphics fragment is available for processing in the current tile. If it is then the flow proceeds to step 62, whereas if it is not then the flow proceeds to step 60 with the beginning of the next tile.

If however it is determined at step 64 that early Z testing is possible then the flow proceeds to step 68 where it is determined if Z updates are currently pending for the display location of this graphics fragment (i.e. with reference to the pending Z updates 58). If there are no Z updates pending then "normal" early depth testing can be performed (step 69) using the associated depth comparison function. The graphics fragment is then either allowed to proceed to the shader pipeline 14 or is culled depending on the outcome of that early depth test. The flow then proceeds to step 70 where it is determined if there is another graphics fragment available for processing in the current tile. If there is the flow proceeds to step 62 and if there is not the flow proceeds to step 60 with the beginning of the next tile. If however at step 68 it is determined that Z updates are pending with respect to the relevant display location for the current graphics fragment, it is then determined at step 71 if the stored update indication is 11. If it is then this indicates that no early depth testing is possible and the flow proceeds to step 66 and from there to step 67 (as described above).

If the stored indication is not 11, then at step 72 it is determined if the stored update indication is 00. If it is then this indicates that the pending Z updates cannot change the depth value currently stored in the depth value buffer 18 for this display location and at step 73 the current update indication (determined for this graphics fragment) is stored as the stored update indication in update storage 54. As above with respect to step 65, this is unless (see box 80 in FIG. 7) it is known that this graphics fragment will not cause pending Z updates, which could for example occur if depth updates for the current graphics fragment are disabled. As another example, in a variant of the ordering illustrated in FIG. 7, if step 69 were to be performed before step 73, then if the current graphics fragment were to be culled by the early depth test of step 69, then the current update indication need not be stored as the stored update indication. However in the variant illustrated in FIG. 7, after step 73 the flow proceeds to step 69 where early depth testing is performed using the associated depth comparison function for this graphics fragment. The flow then proceeds to step 70 to determine if there is another graphics fragment available for the processing in the current tile.

If however at step 72 it is determined that the stored update indication is not 00 (meaning that it must be 01 or 10), the flow proceeds to step 74, where it is determined if the current update is the same as the stored update indication or if the current update indication is 00. These possibilities indicate that the current graphics fragment and its associated depth comparison function do not represent a change in comparison direction for the depth comparison. If however the answer at step 74 is negative then the flow proceeds to step 75—the depth comparison function has changed such that early depth testing is not possible. 11 is then stored as the stored update indication, also preventing further early depth testing from being carried out, unless (box 80 in FIG. 7) it is known that this graphics fragment will not cause pending Z updates, which could for example occur at this point in the flow diagram if depth updates for the current graphics fragment are disabled. The flow then proceeds (as described above) via step 66 and 67.

If however the answer at step 74 is positive then the flow proceeds to step 76 where the control unit 50 modifies the depth comparison function associated with the current graphics fragment such that the depth comparison unit 52 performs a comparison against a range of values bounded by the stored depth value (retrieved from depth value buffer 18). Then at step 77 early depth testing is performed using the modified depth comparison function. In other words, if the current and stored updated indications show 01 then it is known that the stored depth value represents an upper limit on the depth value which will finally be determined for this display location and the depth value for the current graphics fragment can be compared against the range of values bounded by the stored depth value as an upper limit. Conversely if the stored update indication and current indication are 10 then is known that the stored depth value can only be increased by the pending updates and the depth comparison function can be modified to compare against a range of values in which the stored depth value represents a lower limit on the final depth value which will be alternately determined for this display location. From step 77 the flow proceed to step 70 (as described above) to determine if another graphics fragment is available for processing in the current tile.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus for processing graphics primitives for display, comprising, in sequence: rasterization circuitry, depth testing circuitry and rendering circuitry,
   the rasterization circuitry configured to perform rasterization operations on the graphics primitives to generate graphics fragments;
   the depth testing circuitry configured to perform depth testing with respect to a selected graphics fragment of the graphics fragments to determine if the selected graphics fragment would be obscured by at least one other graphics fragment when displayed by comparing a depth comparison function and a depth value associated with the selected graphics fragment with a stored depth value associated with a display location for the selected graphics fragment; and
   the rendering circuitry configured to receive the graphics fragments and to perform rendering operations on the graphics fragments,
   wherein the depth testing circuitry is configured to suppress the rendering operations with respect to the selected graphics fragment if the depth testing indicates that the selected graphics fragment would be obscured,
   wherein the rendering operations performed by the rendering circuitry cause updating of stored depth values associated with display locations for at least some graphics fragments,
   wherein the depth testing circuitry is configured to store an update indication in dependence on a received depth comparison function, wherein the update indication shows a possible change direction due to the updating for a stored depth value which depends on that received depth comparison function, and
   wherein the depth testing circuitry is configured to perform the depth testing with respect to the selected graphics fragment using the possible change direction shown by the update indication to modify the depth comparison function to allow for the updating of the stored depth value by the rendering operations.

2. The apparatus as claimed in claim 1, wherein the apparatus comprises a depth value storage unit configured to store a plurality of depth values and the depth testing circuitry is configured to store update indications for each of the plurality of depth values.

3. The apparatus as claimed in claim 1, wherein the apparatus comprises a depth value storage unit configured to store a plurality of depth values and the depth testing circuitry is configured to store a single update indication for the plurality of depth values.

4. The apparatus as claimed in claim 3, wherein the apparatus is configured to subdivide a display frame into a plurality of tiles and is configured to process graphics primitives for display on a tile-by-tile basis, wherein the depth testing circuitry is configured to store the update indication for each tile processed by the apparatus.

5. The apparatus as claimed in claim 4, wherein the depth testing circuitry is configured to reset the update indication after each tile processed by the apparatus.

6. The apparatus as claimed in claim 3, wherein the depth testing circuitry is configured to store the update indication for each display frame processed by the apparatus.

7. The apparatus as claimed in claim 6, wherein the depth testing circuitry is configured to reset the update indication after each display frame processed by the apparatus.

8. The apparatus as claimed in claim 1, wherein the depth testing circuitry is configured to reference a pending update indication to determine if updating of the stored depth value associated with the display location for the selected graphics fragment can subsequently occur, and
   wherein the depth testing circuitry is configured only to use the possible change direction shown by the update indication to modify the depth comparison function if the pending update indication shows that the updating can subsequently occur.

9. The apparatus as claimed in claim 8, wherein the pending update indication is stored within the depth testing circuitry.

10. The apparatus as claimed in claim 8, wherein the pending update indication is stored within the rendering circuitry.

11. The apparatus as claimed in claim 8, wherein the pending update indication is stored per display location.

12. The apparatus as claimed in claim 1, wherein the depth testing circuitry is configured to reset the update indication when the rendering circuitry is not performing rendering operations.

13. The apparatus as claimed in claim 1, wherein modifying the depth comparison function to allow for updating of the stored depth value comprises treating the stored depth value as a boundary of a range of depth values.

14. The apparatus as claimed in claim 1, wherein the depth testing circuitry is configured to store the update indication to show that the stored depth value will not be changed by the rendering operations.

15. The apparatus as claimed in claim 1, wherein the depth testing circuitry is configured to store the update indication to show that the rendering operations do not allow the depth testing to be performed.

16. The apparatus claimed in claim 1, wherein the updating of stored depth values is carried out by further depth testing circuitry which follows the rendering circuitry.

17. The apparatus as claimed in claim 1, wherein the depth testing circuitry is configured to store the update indication as a 2-bit value.

18. A method of processing graphics primitives for display, comprising, in sequence: a rasterization step, a depth testing step and a rendering step,
   the rasterization step comprising performing rasterization operations on the graphics primitives to generate graphics fragments;
   the depth testing step comprising performing depth testing with respect to a selected graphics fragment of the graphics fragments to determine if the selected graphics fragment would be obscured by at least one other graphics fragment when displayed by comparing a depth comparison function and a depth value associated with the selected graphics fragment with a stored depth value associated with a display location for the selected graphics fragment; and
   the rendering step comprising receiving the graphics fragments and to perform rendering operations on the graphics fragments,
   wherein the depth testing step is configured to suppress the rendering operations in the rendering step with respect to the selected graphics fragment if the depth testing indicates that the selected graphics fragment would be obscured,
wherein the rendering operations cause updating of stored depth values associated with display locations for at least some graphics fragments,
wherein the depth testing step comprises storing an update indication in dependence on a received depth comparison function, wherein the update indication shows a possible change direction for a stored depth value which depends on that received depth comparison function, and
wherein the depth testing in the depth testing step is performed with respect to the selected graphics fragment using the possible change direction shown by the update indication to modify the depth comparison function to allow for updating of the stored depth value by the rendering operations.

19. An apparatus for processing graphics primitives for display, comprising, in sequence:
means for performing rasterization operations on the graphics primitives to generate graphics fragments;
means for performing depth testing with respect to a selected graphics fragment of the graphics fragments to determine if the selected graphics fragment would be obscured by at least one other graphics fragment when displayed by comparing a depth comparison function and a depth value associated with the selected graphics fragment with a stored depth value associated with a display location for the selected graphics fragment; and
means for performing rendering operations on the graphics fragments,
wherein the means for performing depth testing is configured to suppress the rendering operations by the means for performing rendering with respect to the selected graphics fragment if the depth testing indicates that the selected graphics fragment would be obscured,
wherein the rendering operations cause updating of stored depth values associated with display locations for at least some graphics fragments,
wherein the means for performing depth testing is configured to store an update indication in dependence on a received depth comparison function, wherein the update indication shows a possible change direction for a stored depth value which depends on that received depth comparison function, and
wherein the depth testing is performed with respect to the selected graphics fragment using the possible change direction shown by the update indication to modify the depth comparison function to allow for updating of the stored depth value by the rendering operations.

* * * * *